United States Patent
Matsuoka

(10) Patent No.: US 10,144,344 B2
(45) Date of Patent: Dec. 4, 2018

(54) ILLUMINATION APPARATUS

(71) Applicant: TOYODA GOSEI CO., LTD., Kiyoshu-shi (JP)

(72) Inventor: Yoichi Matsuoka, Kiyosu (JP)

(73) Assignee: TOYODA GOSEI CO., LTD., Kiyosu-Shi, Aichi-Ken (JP)

(*) Notice: Subject to any disclaimer, the term of this patent is extended or adjusted under 35 U.S.C. 154(b) by 0 days.

(21) Appl. No.: 15/649,731

(22) Filed: Jul. 14, 2017

(65) Prior Publication Data

US 2018/0022270 A1    Jan. 25, 2018

(30) Foreign Application Priority Data

Jul. 25, 2016 (JP) .................. 2016-145514

(51) Int. Cl.

| | | |
|---|---|---|
| *G01B 13/18* | (2006.01) | |
| *B60Q 1/26* | (2006.01) | |
| *F21V 15/01* | (2006.01) | |
| *B60Q 1/02* | (2006.01) | |
| *F21V 5/04* | (2006.01) | |

(52) U.S. Cl.
CPC ......... *B60Q 1/2696* (2013.01); *B60Q 1/2661* (2013.01); *F21V 15/01* (2013.01); *B60Q 1/02* (2013.01); *F21V 5/04* (2013.01)

(58) Field of Classification Search
None
See application file for complete search history.

(56) References Cited

U.S. PATENT DOCUMENTS

| | | | | |
|---|---|---|---|---|
| 4,733,335 A | * | 3/1988 | Serizawa | ............... B60Q 1/302 |
| | | | | 362/503 |
| 2015/0345753 A1 | | 12/2015 | Mochizuki | |
| 2016/0144779 A1 | | 5/2016 | Inose et al. | |

FOREIGN PATENT DOCUMENTS

| | | |
|---|---|---|
| JP | 2008-155751 A | 7/2008 |
| JP | 2014-157688 A | 8/2014 |
| JP | 2014-175112 A | 9/2014 |
| JP | 2015-000607 A | 1/2015 |

* cited by examiner

*Primary Examiner* — Vip Patel
(74) *Attorney, Agent, or Firm* — McGinn I.P. Law Group, PLLC.

(57) ABSTRACT

An illumination apparatus includes: a light source including an LED and a lens; an illuminated body; and a cover, wherein: the light source is arranged inside the cover; the light from the light source passes between the edge of the cover and the illuminated body; the front edge of the cover defines the illumination range of the light from the light source with respect to the illuminated body; and the light transmittance of such portion of the lens as is near to the illuminated body is higher than that of the remaining portions.

6 Claims, 6 Drawing Sheets

ILLUMINATION APPARATUS

CROSS-REFERENCE TO RELATED APPLICATION(S)

This application is based upon and claims the benefit of priority from Japanese Patent Application No. 2016-145514, filed on Jul. 25, 2016, the entire contents of which are incorporated herein by reference.

BACKGROUND

1. Field of the Invention

The invention relates to an illumination apparatus, in particular, to a vehicle illumination apparatus suitable for indirect illumination.

2. Description of the Related Art

Recently, as an illumination apparatus for a vehicle such as a car, there has been increasingly used an illumination apparatus using an LED.

JP-A-2015-607 discloses an example in which an illumination apparatus using an LED as a light source is used for illumination inside a vehicle. In particular, the patent document 1 discloses specifically a configuration in which, with an illumination apparatus mounted on a mounting structure, an illumination light is output toward an illumination target stored in a drink holder provided on a door lining JP-A-2015-607 discloses a technology which applies an illumination apparatus having an LED or the like as its light source to direct illumination within a vehicle chamber. On the other hand, recently, there has also been known a technology which applies an illumination apparatus having an LED or the like as its light source to indirect illumination within a vehicle chamber. When performing indirect illumination, supposing the illumination apparatus for direct illumination disclosed in the patent document 1 is used as it is, there may be a possibility that the boundary between the light illumination range and the light non-illumination range can appear clearly, or the like, whereby the illumination effect by indirect illumination cannot be as expected.

SUMMARY

The invention is made to solve the above problem and thus an object of the invention is to provide an illumination apparatus using an LED as its light source which can provide a proper indirect illumination effect.

As a result of intensive studies to solve the above problem, the inventor has arrived at the respective aspects of the invention as described below.

That is, according to a first aspect of the invention, there is provided an illumination apparatus, comprising: a light source including an LED and a lens; an illuminated body; and, a cover, wherein the light source is arranged inside the cover, the light from the light source passes between the edge of the cover and the illuminated body, the front edge of the cover defines the illumination range of the light from the light source with respect to the illuminated body, and the light transmittance of such portion of the lens as is near to the illuminated body is higher than that of the remaining portions.

According to the illumination apparatus having the above configuration, the boundary between the illumination range and non-illumination range of the light is made unclear to change gradually the illuminance of the light from the illumination range to the non-illumination range, and the portion to be illuminated with high illuminance can also be maintained, thereby enabling the illumination apparatus to provide a suitable indirect illumination effect.

In a lens in which particles for light transmittance adjustment are dispersed substantially uniformly, a portion thereof having a large plate thickness is lowered in the light transmittance, whereas the portion having a small plate thickness is increased. Therefore, the illuminances of the lights having passed through the respective portions of the lens can be controlled arbitrarily according to the following configuration.

That is, according to a second aspect of the invention, in the above-mentioned illumination apparatus, particles for light transmittance adjustment are dispersed in the lens.

According to a third aspect of the invention, in the above-mentioned illumination apparatus, the light transmittance of the lens is controlled by the thickness of the lens.

According to a fourth aspect of the invention, in the above-mentioned illumination apparatus, the surface of the lens is formed in multiple stages.

According to a fifth aspect of the invention, in the above-mentioned illumination apparatus, the surface of the lens is formed in an inclined manner.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Description is given below of a meter cluster 1 including an illumination apparatus according to an embodiment of the invention with reference to the drawings.

Figure 1:
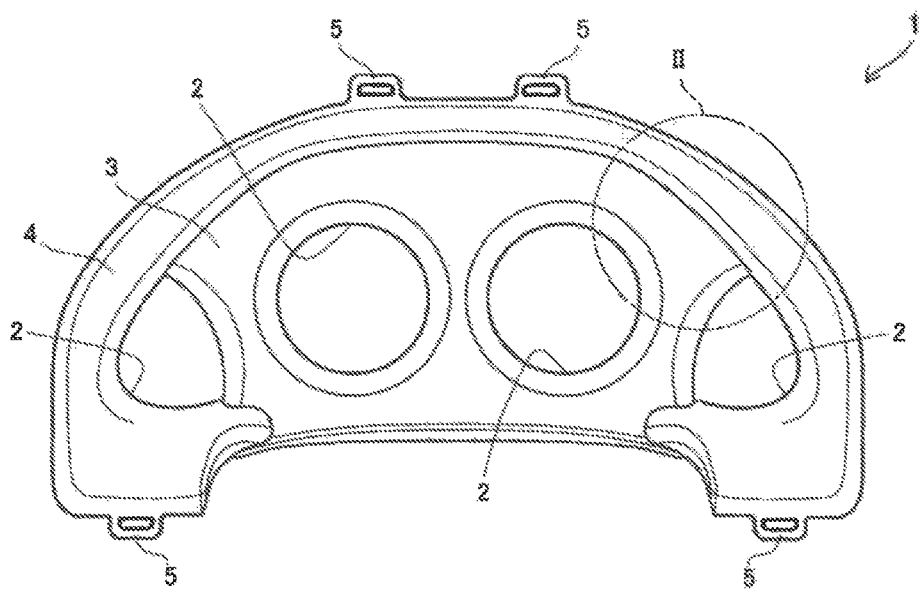
FIG. 1 is a schematic front view of a meter cluster according to an embodiment of the invention.

FIG. 1 is a schematic front view of a meter cluster 1 according to an embodiment of the invention. The meter cluster 1 is an apparatus which primarily fulfills the role of eaves to prevent the display of a meter device, by which a driver confirms the running state of a vehicle, from being made hard to be visually seen due to incident of sunlight. The meter cluster 1 shown in FIG. 1 comprises: a base body 3 having multiple openings 2 used to expose and display multiple display boards (not shown) each including a speed meter, a tachometer, a direction indicator light and various warning lights; and, an outer frame 4 having an eaves part in the peripheral edge thereof. In the multiple parts of the peripheral edge of the outer frame 4, there are provided multiple mounting parts 5 for mounting the meter cluster 1 onto an instrumental panel of the vehicle.

Figure 2:
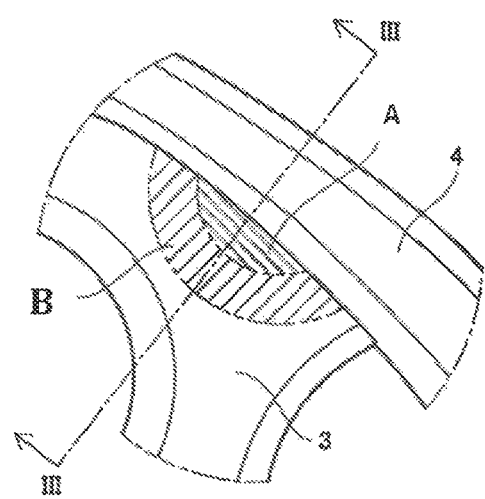
FIG. 2 is an enlarged view of main parts of the meter cluster of FIG. 1.

FIG. 2 shows enlargedly such range of the meter cluster 1 of FIG. 1 as is surrounded by the dash dotted-line II. The meter cluster 1 of this embodiment illuminates the area A of the surface of the base body 3 indicated by diagonally downward slopes to the right with relatively high illuminance, and illuminates the area B existing around the area A and indicated by diagonally downward slopes to the left with relatively low illuminance, whereby the boundary between the illumination range of the area B and the non-illumination range outside the area B becomes unclear and the illuminance of the light from the illumination range to the non-illumination range changes gradually. The above illumination of the areas A and B is performed by indirect illumination using a lamp unit 10 provided inside the outer frame 4.

Figure 3:
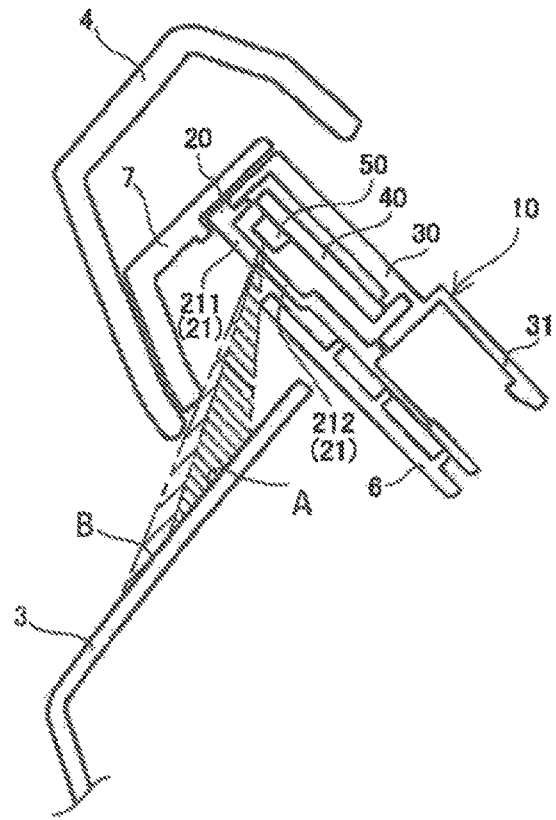
FIG. 3 is a section view when a section along the dash dotted-line III-III of the meter cluster of FIG. 2 is viewed in the direction of arrows.
Figure 4A:
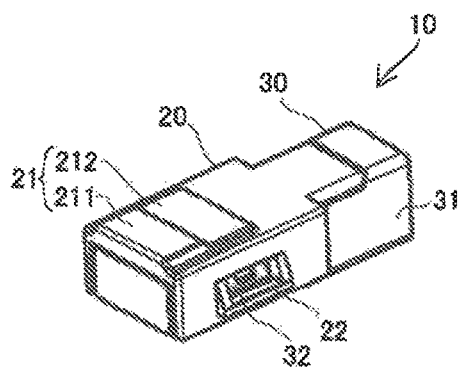
FIG. 4A is a perspective view of a lamp unit according to the embodiment.
Figure 4B:
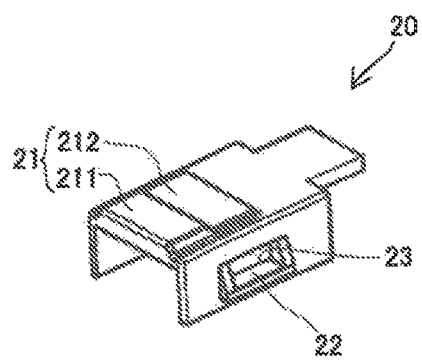
FIG. 4B is a perspective view of a lens body of the lamp unit.

FIG. 3 is a section view when a section along the dash dotted-line III-III of the meter cluster 1 of FIG. 2 is viewed in the direction of arrows. FIG. 4A is a perspective view of the lamp unit 10. The lamp unit 10 includes a lens body 20 having a lens 21, and a housing 30. FIG. 4B is a perspective view which shows only the lens body 20. The lens 21 is formed to rise in a trapezoidal shape on the front surface (in FIG. 3, on the upper surface) of the lens body 20. The lens 21 includes two trapezoidal lens parts 211 and 212 having different heights. The lens body 20 includes two engaging projections 22 on the two side surfaces thereof and two engaging holes 23 respectively formed inside the engaging projections 22. The lens body 20 is formed of a resin such as a polycarbonate resin or an acrylic resin, while particles for light transmittance adjustment formed of titanium oxide ($TiO_2$), acrylic beads or the like are dispersed at least in a part thereof including the lens 21 or over the whole thereof, thereby adjusting the transmittance of the light.

The housing 30 of the lamp unit 10 includes on the two side surfaces thereof engaging projections 32 for engagement with the engaging holes 23 of the lens body 20. When the engaging projections 32 on the two sides are engaged with the engaging holes 23 of the lens body 20 on the two sides respectively, the lens body 20 and housing 30 are united, thereby defining the outer shape of the lamp unit 10. On the end portion of the housing 30, there is formed a socket 31 to which a connector (not shown) for power supply can be connected.

Figure 5:
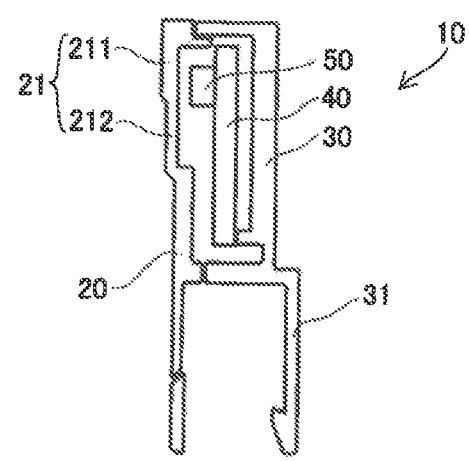
FIG. 5 is a longitudinal section view of the lamp unit of FIG. 4A.

FIG. 5 is a longitudinal section view of the lamp unit 10 of FIG. 4A, illustrating only the lamp unit 10 of FIG. 3. As illustrated, within a space defined by the lens body 20 and housing 30, there is provided a base plate 40; and, an LED 50 is arranged on the base plate 40. The optical axis of the LED 50 is directed to the surface of the lens 21 on the back side. Here, a structure of wiring etc. for supplying power to the base plate 40 from the connector connected to the socket 31 is omitted.

As shown in FIG. 5, the lens 21 is constituted of a first lens part 211 having a relatively large thickness and a second lens part 212 having a relatively small thickness. Particles for light transmittance adjustment are dispersed almost uniformly in the first and second lens parts 211 and 212. The refractive index of the particles for light transmittance adjustment is set higher than the resin constituting the other portions of the lens 21 than the particles for light transmittance adjustment. Therefore, the light emitted from the LED 50 and incident on the lens 21 is refracted in the boundary between particles for light transmittance adjustment within the lens 21 and resin around them and is thereby hard to transmit here. Such light of the light emitted from the LED 50 as is incident on the first lens part 211 having a relatively large thickness is influenced by refraction due to a relatively large amount of particles for light transmittance adjustment while transmitting the first lens part 211, whereas the light incident on the lens part 212 having a relatively small thickness is influenced by refraction due to a relatively small amount of particles for light transmittance adjustment while transmitting the second lens part 212. Thus, the light is harder to transmit the first lens part 211 where it is influenced by a relatively large amount of particles for light transmittance adjustment than the second lens part 212 where it is influenced by a relatively small amount of particles for light transmittance adjustment. That is, the first lens part 211 is relatively low in the light transmittance, while the second lens part 212 is relatively high in the light transmittance. In a specific example, the transmittance of the visible light of the first lens part 211 is about 6%, whereas the transmittance of the visible light of the second lens part 212 is about 12%. Thus, the first and second lens parts 211 and 212 respectively have such light transmittance as enables human eyes to recognize brightness and darkness.

The thickness of the first lens part 211 is set about 1.2 to about 2.5 times the thickness of the second lens part 212, more preferably, about 1.5 to about 2.0 times; and, in an example, it is set 1.5 times. The thickness of the first lens part 211 is, for example, a value within the range of 1.5 to 2.0 mm; and, in an example, it is 1.5 mm The thickness of the second lens part 212 is, for example, a value within the range of 1.0 to 1.5 mm; and, in an example, it is 1 mm Since the first and second lens parts 211 and 212 are respectively formed such that the surfaces thereof on the light exit side have a flat plate-like trapezoidal shape, they are relatively easy to form.

As shown in FIG. 3, the meter cluster 1 has a retainer 6 therein and the lamp unit 10 is mounted on the retainer 6. More specifically, when the engaging projections 22 of the lamp unit 10 are engaged into engaging holes (not shown) of the retainer 6, the lamp unit 10 can be fixed to the retainer 6 and thus can be united with the other parts of the meter cluster 1, thereby enabling the lamp unit 10 to retain a given position relationship with them. The meter cluster 1 has an eaves-like cover 7 inside the outer frame 4, while the lamp unit 10 is mounted on the inside of the cover 7. The cover member 7 is formed of opaque material or is coated with opaque material, whereby it is formed as a part which does not transmit light.

As shown in FIG. 3, between the base body 3 and cover 7 of the meter cluster 1, there is formed a clearance. The light emitted from the LED 50 and having passed through the lens 21 passes through the clearance and is radiated into such portions of the surface part of the base body 3 as are shown by the areas A and B in FIG. 2. Therefore, between the base body 3 and outer frame 4, there is also formed a clearance. The arrangement relationship between the respective members is decided in order that the light emitted from the LED 50 and having passed through the second lens part 212 radiates the area A and the light emitted from the LED 50 and having passed through the first lens part 211 radiates the area B. In particular, the outer edge of the radiation range of the light emitted from the LED 50, that is, the outer edge of the area B is defined by the edge of the cover 7. That is, as shown in FIG. 3, a portion, where a line connecting the light emission point of the LED 50 to the edge of the cover 7 intersects with the surface of the base body 30, provides the outer edge of the area B. Therefore, there is employed a position relationship in which the outer frame 4 does not intersect with the line connecting the light emission point of the LED 50 to the edge of the cover 7.

Also, as shown in FIG. 3, of the lens 21, the second lens part 212 having relatively high light transmittance is disposed nearer to the base body 3 serving as an illuminated object than the first lens part 211 having relatively low light transmittance. And, the light, which is emitted from the LED 50 and passes through the boundary between the first and second lens parts 211 and 212, is allowed to pass through the clearance between the base body 3 and cover 7, whereby the boundary between the areas A and B is allowed to exist at a position which exists on the surface of the base body 3 and is not hidden by the outer frame 4. Thus, there is realized indirect illumination in which bright and dark areas are separated from each other as shown in the areas A and B of FIG. 2. The illuminance of the light in the area B is lowered, whereby the boundary between the illumination range of the area B and the non-illumination range existing outside it is made unclear and the illuminance of the light from the illumination range to the non-illumination range is caused to change gradually; and, simultaneously, in the area A, high illuminance is maintained.

Comparison Example

Figure 7:
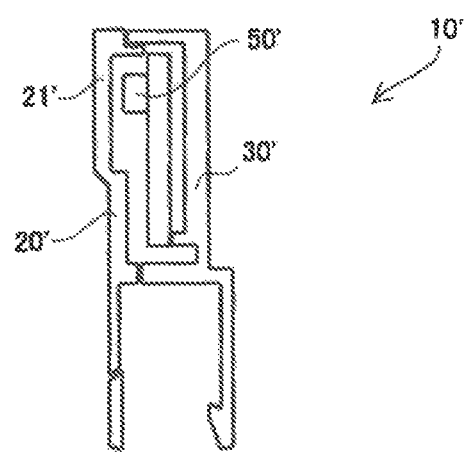
FIG. 7 is a longitudinal section view of a lamp unit according to a comparison example of the invention.
Figure 8:
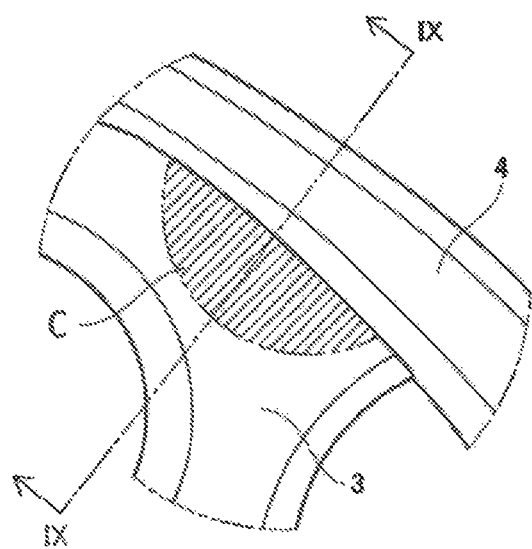
FIG. 8 is a view of main parts of a meter cluster using the lamp unit of FIG. 7.
Figure 9:
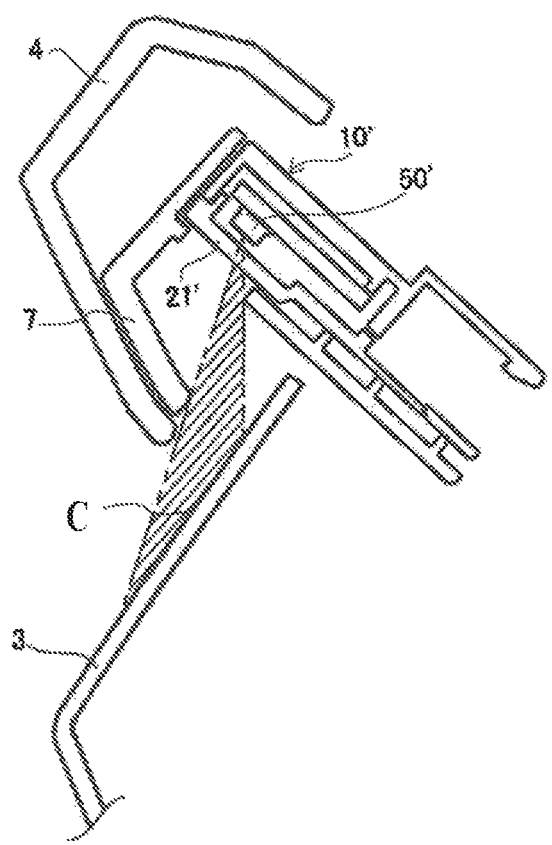
FIG. 9 is a section view when a section along the dash dotted-line IX-IX of the meter cluster of FIG. 8 is viewed in the direction of arrows.

As a comparison example, in FIG. 7, there is shown a lamp unit 10' in which a lens 21' of a lens body 20' has a given thickness (for example, 1.5 mm). FIG. 8 is an enlarged explanatory view to show the state of indirect illumination provided by the lamp unit 10' when the lamp unit 10' is applied to the meter cluster 1; and, it corresponds to FIG. 2 of the embodiment. FIG. 9 is a section view when a section along the dash dotted-line IX-IX of the meter cluster 1 of FIG. 8 is viewed in the direction of arrows.

As shown in FIG. 9, the light emitted from the LED 50 and having passed through the lens 21' is radiated on an area C of the surface of the base body 3. When the quantity of particles for light transmittance adjustment dispersed in the lens body 20' is increased to such degree that the boundary between the illumination range and the non-illumination range is made unclear so as to change gradually the illuminance from the illumination range of the area C to the non-illumination range existing outside the area C, the illuminance of the area C becomes dark as a whole, thereby disabling execution of indirect illumination in which illuminance is high partially like the area A of the lamp unit 10 of the embodiment. Thus, in the lamp unit 10' of the comparison example, it is difficult to deal with contradictory demands that the illuminance of the illumination range is decreased so as to make unclear the boundary between the illumination range and the non-illumination range and the illuminance of the illumination range is increased partly.

(Modification)

Figure 6A:
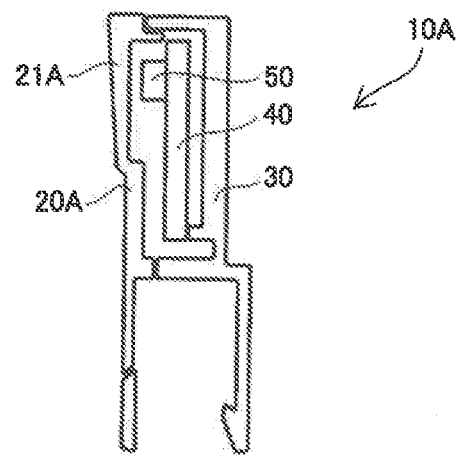
FIGS. 6A to 6C are longitudinal section views of lamp units according to multiple modifications of the embodiment.
Figure 6B:
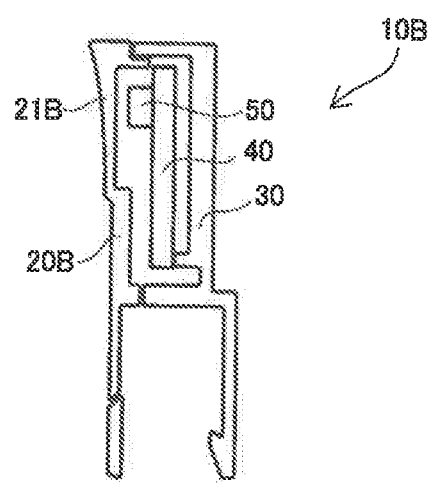
Figure 6C:
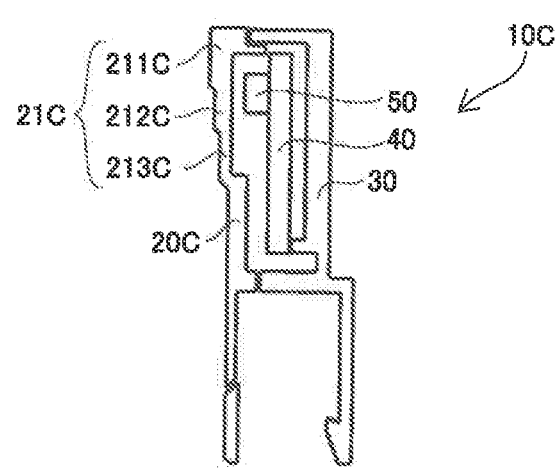

A method for increasing relatively the light transmittance of such portion of the lens 21 as exists near to the base body 3 is not limited to a method employing a second stage structure in which, like the above-mentioned embodiment, the lens 21 is constituted of the first and second lens parts 211 and 212. For example, like a lens body 20A of a lamp unit 10A shown in FIG. 6A, there may be employed a method in which the lens 21A has an inclined plane surface and the thickness of the lens 21A reduces continuously from the side distant from the base body 3 toward the side near thereto. Or, like a lens body 20B of a lamp unit 10B shown in FIG. 6B, there may be employed a method in which the lens 21B has a curved surface and the thickness of the lens 21B reduces continuously from the side distant from the base body 3 toward the side near thereto. Or, like a lens body 20C of a lamp unit 10C shown in FIG. 6C, there may be employed a method in which a lens 21 has a three-stage lens part constituted of first, second and third flat lens parts 211C, 212C and 213C, or has three or more stages of lens parts. Further, there may be employed a method in which these configurations are combined.

Also, even in a configuration in which, like the lamp unit 10' of the comparison example, the lens 21' has a given thickness, the invention can be implemented in a method in which a seal is attached or paint is applied to the surface of such portion of the lens 21' as is distant from the base body 3, whereby the light transmittance of such portion of the lens 21' as is distant from the base body 3 is set relatively low and the light transmittance of such portion of the lens 21' as is near to the base body 3 is set relatively high.

The contents of the open patent publication cited in the specification are all incorporated herein by reference.

What is claimed is:

1. An illumination apparatus comprising:
   a light source including an LED and a lens;
   an illuminated body; and
   a cover,
   wherein:
   the light source is arranged inside the cover;
   light from the light source passes between a front edge of the cover and the illuminated body;
   the front edge of the cover defines an illumination range of the light from the light source with respect to the illuminated body; and
   a portion of the lens disposed nearest to the illuminated body has a light transmittance higher than a light transmittance of remaining portions of the lens farther from the illuminated body.

2. The illumination apparatus according to claim 1, wherein particles for light transmittance adjustment are dispersed in the lens.

3. The illumination apparatus according to claim 1, wherein the light transmittance of the lens is controlled by a thickness of the lens.

4. The illumination apparatus according to claim 1, wherein a surface of the lens is formed in multiple stages.

5. The illumination apparatus according to claim 1, wherein a surface of the lens is formed in an inclined manner.

6. The illumination apparatus according to claim 1, wherein a surface of the lens includes an inclined surface.

* * * * *